United States Patent Office 3,470,966
Patented Oct. 7, 1969

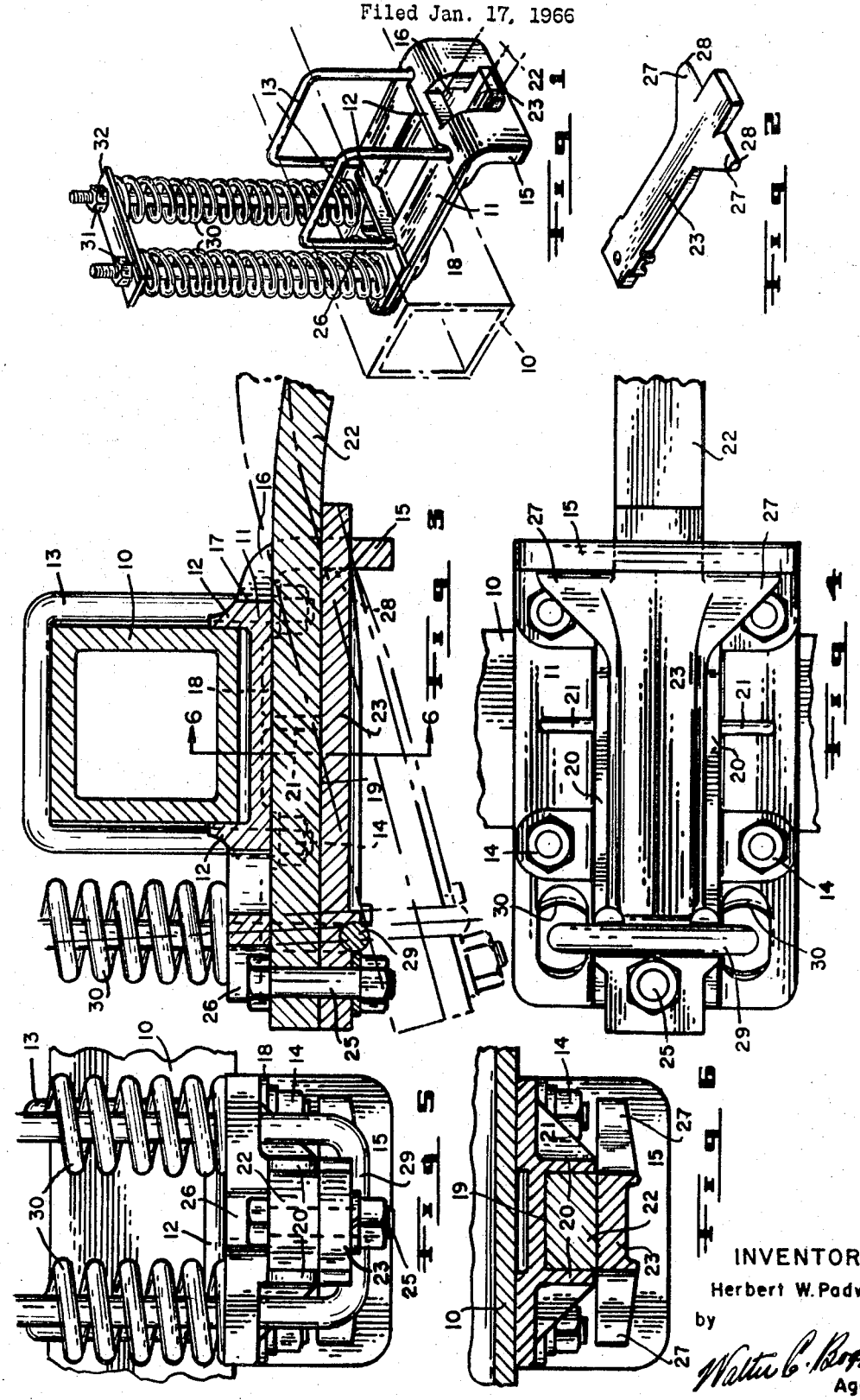

3,470,966
IMPLEMENT TOOL SHANK MOUNTINGS
Herbert W. Padwick, Box 707, Regina,
Saskatchewan, Canada
Filed Jan. 17, 1966, Ser. No. 521,084
Int. Cl. A01b 35/20, 35/24, 39/20
U.S. Cl. 172—710    5 Claims

ABSTRACT OF THE DISCLOSURE

An implement tool shank mounting wherein an L-shaped keeper plate is secured to and below a cross member of the implement with the short flange of said plate projecting downward and provided with a rectangular opening which receives the upper end of a tool shank therethrough; a cruciform bar bolted to and underlying the received shank end with the stub end of the bar in said opening to prevent side play and the side arms of the bar stopped against the sides of the opening to provide a pivot thereon; a U-bolt straddling the adjacent ends of the bar and the shank, with the legs of the U passing up through said plate and receiving coil springs for resiliently clamping said straddled members to the plate; and said shank swingable on said pivot, against said resilience, when the lower end of the shank is operated.

---

This invention relates to a shank mounting for agricultural implements, and more particularly to shanks for resiliently holding lower tools such as plows, cultivators, weeders and the like in soil-working relation with the ground, as the implement moves thereover. The upper ends of such shanks are usually secured in boxings which pivot on cross bars of the implement frame. Accordingly, the tools can swingably and upwardly retract against spring resistance when the tools strike an obstruction, such as an imbedded stone, thus permitting the tools to pass thereover and return under the spring reaction.

In the working of the above type implement, the shanks hold the working tools while the springs have a tendency to give a certain amount, due to variations in the soil resistance, and accordingly the tool shanks are constantly rocking. Actually, this agitation further helps to till the soil. However, this rearward rocking results in wear, including noise and looseness at the boxing pivots. Greasing is useless, due to the dust created by the tools of the implement.

The principal objects of the present invention are: to provide a spring-clamp mounting directly between the implement frame and the tool shank, whereby the upper end of the shank will be securely held against the vibration of the working tool as the machine moves over the ground; provide accommodation for said vibration of the tool during operation; and provide means whereby said upper end of the shank will fulcrum on the mounting to release the clamp, for fast lift-retraction of the tool to clear an obstruction, when the tool strikes said obstruction.

A further object of the invention is: to provide the shank with a removable auxiliary fulcrum member to prevent binding of the clamping mechanism in the release operation, and improve the lift of the tool.

A further object of the invention is: to provide means for preventing shank creep and lateral movement of the tool, at the mounting.

Still further objects of the invention are: to design the mounting in a simple manner; for low cost and easy manufacture; including elimination of pivot pins and lubricant fittings; yet of strong sturdy construction for many years of satisfactory useful service.

With the above important and other minor objects in view, which will become more apparent as the disclosure proceeds, the invention consists essentially in the construction and arrangement of the various parts hereinafter more particularly described, reference being had to the accompanying drawings wherein:

FIGURE 1 is a perspective rear view of the shank mounting on the cross bar of an implement, the cross bar and shank being shown in dot and dash outline.

FIGURE 2 is a perspective view of the cruciform bar.

FIGURE 3 is an enlarged vertical longitudinal section through the mounting and the cross bar, the pivot of the shank being shown in dot and dash outline.

FIGURE 4 is an inverted plan view of the showing in FIGURE 3.

FIGURE 5 is a front view of the construction shown in FIGURE 3.

FIGURE 6 is a vertical cross section taken on the line 6—6 of FIGURE 3.

In the drawings like characters of reference indicate corresponding parts in the several figures.

The cross bar of an implement frame is generally indicated at 10 in the drawings, and is formed from a square tubing. A number of such cross bars may be provided in spaced relation therealong and each adapted to receive a plurality of spaced shank mountings thereon, one of which is best shown in FIGURE 1, and will now be described.

The base of the mounting comprises an end-flanged keeper plate 11, the central upper surface of which is provided with a pair of spaced and reversed cavetto mouldings 12, partly and centrally thereacross (FIGURES 1 and 3). These mouldings receive the underside of the above square cross bar 10 therebetween. A pair of inverted U-bolts 13 straddle the cross bar, and their legs pass down through holes in the keeper plate, at the ends of the mouldings, and are threaded to receive nuts 14 for clamping the keeper plate to the cross bar.

The rear end of the keeper plate 11 has the vertical flange 15 thereof projecting downward, and this flange is centrally provided with a rectangular-shaped opening 16, the upper edge of which is upwardly deflected, as shown at 17 in FIGURE 3. The underside of the keeper plate, in front of the flange, is cut away along each side, as shown at 18, except where the U-bolts 13 pass through, thus providing a central flat surface 19 therealong. This latter surface is provided with a pair of spaced downwardly extending guides 20, one on each side (see FIGURE 6). These guides are reinforced by central side webs 21.

The upper straight rectangular end of a curved tool shank 22 passes through the rectangular opening 16 in the flange of the keeper plate, from the back, and is adapted to rest up against the surface 19, and be aligned by the guides 20, as shown in FIGURE 6. A short rectangular cruciform bar 23, best shown in FIGURE 2, is positioned below this end of the tool shank, and the forward end of this bar is flush with the front end of the shank and is secured by a central bolt 25, a semi-circular slot 26 being centrally cut-out of the front end of the keeper plate to receive the head of this latter bolt.

The short rear end of the cruciform bar 23 passes through the opening 16, is provided with short outwardly extending side arms 27 which are stopped against the front surface of the flange 15. The rear edges of these side arms are rounded, for sliding contact with the flange, as indicated at 28 in FIGURE 3, and such that it can rock with the tool shank 22 at this point, as shown in dot and dash outline. It will also be noted that the arms of the cruciform bar form a line-point contact along the flange, and so prevent lateral movement of the tool shank.

A long U-bolt 29 straddles the cruciform bar and the tool shank, just behind the bolt 24, and the legs thereof pass up through holes in the keeper plate and extend thereabove, where each telescopically receives a coil spring 30. Both of these latter springs are normally under compression by nuts 31 which are threaded on the leg ends, and act against a connector plate 32 which slides thereon and rides the springs. Accordingly, the springs 30 normally hold the tool shank against the underside of the keeper plate for rigidity, and the lower tool (not shown) in soil working position on the shank. As the implement frame (not shown) can be raised and lowered on its ground wheels (not shown), the cross bar 10 will similarly vary in height to regulate the depth cut of the shank working tool. In this connection, the guides 20 further prevent any transverse movement of the shank, while said lower tool is working.

From the above disclosure it will be appreciated that the keeper plate of the shank mounting is rigidly clamped to the implement cross bar by the U-bolts 13, and this keeper plate directly connects the tool shank 22 therewith, through the springs 30 and the rocking connection at the line-point contact 28. Accordingly, there is no free play therebetween. Yet, the connection is such that the resiliency in the tool shank can still have full play to allow a certain amount of lengthwise reciprocation to the working tool, for further tilling of the soil. If any wear occurs at the line-contact point, both the shank and the cruciform bar will move back to take up the slack, and permit no clearance. Obviously, the length of this line-contact, plus the surface contact between the guides 20 and the shank insure that the tool will have no side play, although the resiliency inherent in the shank is not restrained, as mentioned. If the retracting pressure on the shank becomes too great, such as the tool striking an imbedded stone, the reaction will cause the upper end of the shank to resiliently rock the cruciform bar to release the clamp, in a fast lift of the shank for clearing said stone.

It will be particularly noted that the cruciform bar not only prevents rear creeping of the tool shank on the keeper plate, but permits free movement of the legs of the U-bolt 29 through the holes in the keeper plate without rubbing when the tool shank rocks. In other words, this mounting cannot jam, and no pivot pins or lubricants are required.

What I claim as my invention is:

1. In a cultivating implement having a cross bar; a tool shank mounting therefor, comprising: a keeper plate clamp secured across and below said bar, and having a downwardly projecting flanged end; there being a rectangular central opening through said flanged end, for reception of the upper end of a tool shank therethrough; a fulcrum arm having one end thereof secured to the underside of said received shank end; the opposite end of said arm T-shaped, centrally and partially passing through said opening, and the side wings of the T defining a rolling line contact against the inner face of said keeper plate flange, for tilting movement of said arm and shank thereon; a U-bolt straddling said arm and inserted shank end, with the legs of said bolt slidably passing up through and extending from the upper face of said keeper plate; coil springs telescoped over said extending legs; and means on the legs for compressing said springs against the keeper plate, to clamp said plate and said shank together.

2. In combination with a cross bar of an implement; a tool shank mounting therefor, comprising: a keeper plate clamped to said cross bar and having a rear downwardly projecting flange; a tool shank mounted in the keeper plate, there being a rectangular central opening through said flange for passage of the upper end of the tool shank therethrough; a cruciform bar clamped to and below said shank with the short rear end thereof protruding through the opening while the side arms of the bar are in contact against the inner face of the downwardly projecting flange adjacent the opening therein to prevent rear movement and side play of said bar and shank; and resilient means yieldably connecting the bar with the keeper plate such that the shank and bar can slidably pivot on the keeper plate and the flange respectively for rocking of the shank through the opening, against the resistance of the resilient means.

3. In combination with a cross bar of an implement; a tool shank mounting therefor, comprising: a keeper plate straddling the bottom of said cross bar, clamped thereto, and having a rear downwardly projecting flange; a tool shank mounted in the keeper plate, there being a rectangular central opening through said flange for endwise passage of the tool shank therethrough; a cruciform bar clamped to and positioned below said shank; the short rear end of said bar protruding through the opening while the side arms of the bar are rounded and in line contact against the inner face of the downwardly projecting flange adjacent the opening therein to prevent rear movement and side play of said shank and bar; a U-bolt positioned around the bar and shank with the legs of the U passing up through lengthwise slots in the keeper plate to receive resiliently adjustable compression springs which act with the upper part of said keeper plate such that the shank can pivot through the opening on said keeper plate and on the rounded arms of the bar, against the resilience of said compression springs.

4. A tool shank mounting as defined in claim 2, wherein a pair of spaced endwise guide members project downwardly on either side of said tool shank from said keeper plate, for retention of the adjacent part of the shank therein.

5. In a tool shank mounting wherein an angle-shaped keeper plate is frame-supported with the flange of the plate extending downwardly and provided with a central opening through which a tool shank is received; an anchoring member for said shank, comprising: a cruciform bar having means thereon for clamp attachment of said bar to the received portion of the shank while the short end of the bar is received through said opening, and such that the shank can fulcrum on the keeper plate and be endwise stopped in one direction by the side arms of the bar contacting against the inner face of the downwardly projecting flange adjacent the opening therein, in the rocking of the shank on said mounting.

References Cited

UNITED STATES PATENTS

| | | | |
|---|---|---|---|
| 3,031,019 | 4/1962 | Gysler | 172—710 |
| 2,869,657 | 1/1959 | Harrop | 172—710 |
| 3,314,487 | 4/1967 | Kopaska et al. | 172—710 |

ROBERT E. BAGWILL, Primary Examiner

S. C. PELLEGRINO, Assistant Examiner

U.S. Cl. X.R.

306—1.5